US009279456B2

(12) United States Patent
Little

(10) Patent No.: US 9,279,456 B2
(45) Date of Patent: Mar. 8, 2016

(54) HOUSING MOUNTED EXTERNAL BEARING SHIELD

(71) Applicant: Schaeffler Technologies AG & Co. KG, Herzogenaurach (DE)

(72) Inventor: Travis Little, Spartanburg, SC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/615,053

(22) Filed: Feb. 5, 2015

(65) Prior Publication Data

US 2015/0285309 A1    Oct. 8, 2015

Related U.S. Application Data

(60) Provisional application No. 61/974,791, filed on Apr. 3, 2014.

(51) Int. Cl.
*F16C 33/78*   (2006.01)
*F16C 35/04*   (2006.01)
*B23P 15/00*   (2006.01)

(52) U.S. Cl.
CPC ............ *F16C 35/042* (2013.01); *B23P 15/003* (2013.01); *F16C 33/7856* (2013.01); *Y10T 29/49703* (2015.01)

(58) Field of Classification Search
CPC ............... F16C 33/78; F16C 33/33783; F16C 33/7886; F16C 33/80; F16C 33/805
See application file for complete search history.

(56) References Cited

U.S. PATENT DOCUMENTS

| 4,342,490 | A  | * | 8/1982  | Swinley          | 384/489 |
| 5,678,934 | A  | * | 10/1997 | Fischer et al.   | 384/489 |
| 5,711,618 | A  | * | 1/1998  | Waskiewicz       | 384/489 |
| 7,435,005 | B2 | * | 10/2008 | Schmidl et al.   | 384/480 |
| 2003/0039422 | A1 | * | 2/2003 | Nisley et al.    | 384/477 |
| 2003/0103701 | A1 | * | 6/2003 | Steinebach       | 384/489 |
| 2006/0188191 | A1 | * | 8/2006 | Schenk et al.    | 384/489 |

FOREIGN PATENT DOCUMENTS

EP      0554773 B1   9/1995
EP      2429276 B1   3/2013

OTHER PUBLICATIONS

"Features Radial insert ball bearings; Seal types," Website. (Jan. 1, 2013).

* cited by examiner

*Primary Examiner* — Thomas R. Hannon
(74) *Attorney, Agent, or Firm* — Volpe and Koenig, P.C.

(57)  ABSTRACT

A bearing assembly including an outer bearing ring and an inner bearing ring adapted to receive a shaft, with rolling elements between the rings, is provided. A seal extends radially between the inner bearing ring and the outer bearing ring. A housing is provided including an opening in which the outer bearing ring is supported. The housing includes at least one groove on a radially inner surface that extends from an axial end surface of the housing and at least one radially outwardly extending slot arranged within the at least one groove. A circumferential shield including a radially outer portion having at least one retention tab is engaged within the at least one slot of the housing. A body of the shield is arranged adjacent to the seal and a radially inner portion of the body extends radially inwardly to a radially outer surface of the inner bearing ring.

9 Claims, 4 Drawing Sheets

HOUSING MOUNTED EXTERNAL BEARING SHIELD

INCORPORATION BY REFERENCE

The following documents are incorporated herein by reference as if fully set forth: U.S. Provisional Patent Application No. 61/974,791, filed Apr. 3, 2014.

FIELD OF INVENTION

This application is generally related to a bearing assembly and is more particularly related to a shield for a bearing assembly.

BACKGROUND

Bearing assemblies are used in automotive and various other applications. In known bearing assemblies, lubricant is supplied to the rolling surfaces of the bearing assembly to reduce friction and improve performance of the bearing assembly. It is desirable to prevent the egress of lubricant from the bearing assembly in order to ensure reliable operation. In the prior known bearing assemblies, multiple types of seals are used to prevent the egress of lubricant. In order to ensure reliable operation of a bearing assembly, it is also desirable to prevent the ingress of debris into the bearing assembly. Known solutions for preventing ingress of debris into a bearing assembly include installing specially machined shields into customized housings. These known housing mounted shields require complex machining and assembly. It would be desirable to provide a simplified bearing assembly that both prevents the egress of lubricant from the bearing assembly and prevents the ingress of debris into the bearing assembly.

SUMMARY

A bearing assembly including a housing mounted shield that provides a tortuous path for both the egress of lubricant and the ingress of debris is provided. The bearing assembly includes an outer bearing ring and an inner bearing ring adapted to receive a shaft. A housing is provided including an opening in which the outer bearing ring is supported. The housing includes at least one groove on a radially inner surface that extends from an axial end surface of the housing and at least one radially outwardly extending slot arranged within the at least one groove. A seal extends radially between the inner bearing ring and the outer bearing ring. A circumferential shield that includes a radially outer portion having at least one retention tab is engaged within the at least one slot of the housing. A body of the shield is arranged adjacent to the seal and a radially inner portion of the body extends radially inwardly to a radially outer surface of the inner bearing ring.

A method of installing a shield with a bearing assembly is also provided. The method includes providing a bearing assembly including an inner bearing ring, an outer bearing ring, and a plurality of rolling elements supported between the inner bearing ring and the outer bearing ring. The method includes providing a seal that extends radially between the inner bearing ring and the outer bearing ring. The method includes providing housing that includes an opening in which the outer bearing ring is supported and at least one groove on a radially inner surface that extends from an axial end surface of the housing, and at least one radially outwardly extending slot arranged within the at least one groove. The method includes providing a circumferential shield that includes a radially outer portion having at least one elastically deformable retention tab. The method includes inserting the at least one elastically deformable retention tab of the shield into the at least one slot of the housing such that the at least one elastically deformable retention tab is resiliently engaged within the at least one slot of the housing.

Preferred arrangements with one or more features of the invention are described below and in the claims.

BRIEF DESCRIPTION OF THE DRAWINGS

The foregoing Summary as well as the following Detailed Description will be best understood when read in conjunction with the appended drawings. In the Drawings.

DETAILED DESCRIPTION OF THE PREFERRED EMBODIMENTS

Figure 1:
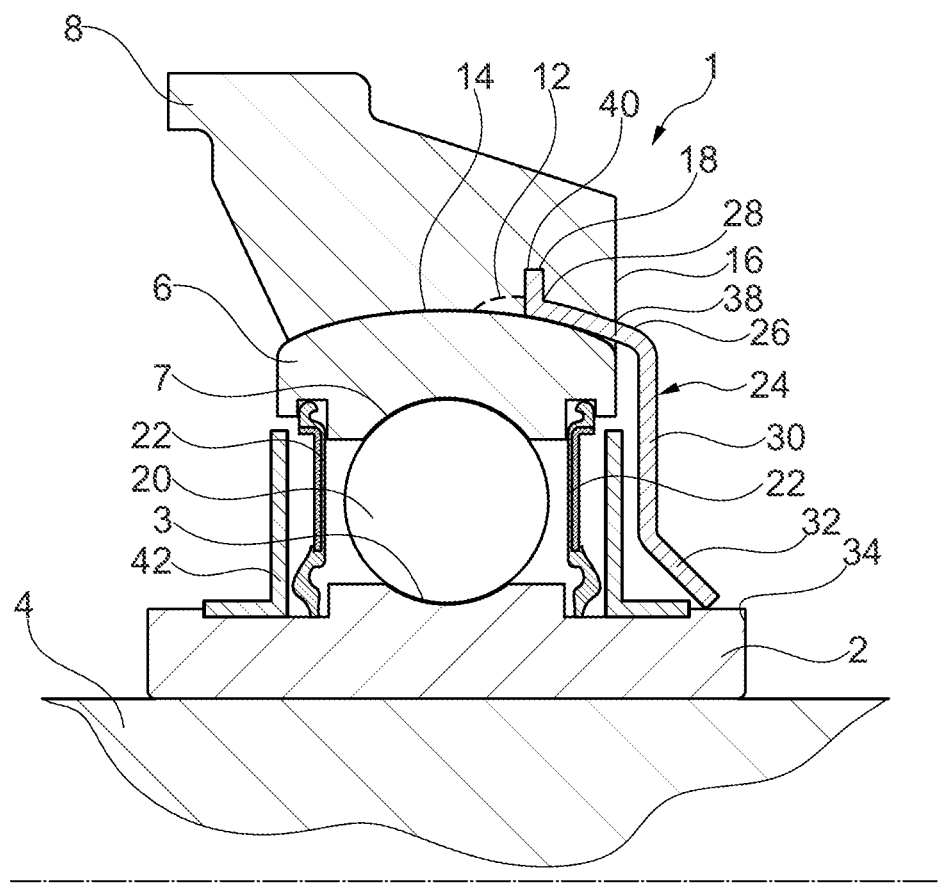
FIG. 1 is a cross-sectional view of a rolling bearing assembly with a shield according to the present invention.

Certain terminology is used in the following description for convenience only and is not limiting. The words "inner," "outer," "inwardly," and "outwardly" refer to directions towards and away from the parts referenced in the drawings. A reference to a list of items that are cited as "at least one of a, b, or c" (where a, b, and c represent the items being listed) means any single one of the items a, b, or c, or combinations thereof. The terminology includes the words specifically noted above, derivates thereof, and words of similar import.

FIG. 1 shows a bearing assembly 1 including a shield 24 according to the present invention. The bearing assembly 1 includes an inner bearing ring 2 adapted to receive a shaft 4, and an outer bearing ring 6. A plurality of rolling elements 20 are supported between the inner bearing ring 2 and the outer bearing ring 6. The inner bearing ring 2 defines an inner race 3 on which the plurality of rolling elements 20 run, and the outer bearing ring 6 defines an outer race 7 on which the plurality of rolling elements 20 run. In a preferred arrangement, lubricant is supplied to contact surfaces of the rolling elements 20 and the inner and outer rings 2, 6 to prevent friction and reduce wear.

A seal 22 extends radially between the inner bearing ring 2 and the outer bearing ring 6, preferably on each axial side of the rolling elements 20, to prevent egress of the lubricant from the bearing assembly 1. In a preferred arrangement, the seal 22 is a lip seal formed from a polymeric material. The seal 22 is preferably mounted on the outer bearing ring 6, and preferably includes a friction reducing coating at the contact surface of the inner ring. One of ordinary skill in the art recognizes that the seal 22 can be mounted on another component of the bearing assembly 1 depending on the application.

In one preferred arrangement, the bearing assembly 1 includes a radially extending flinger disk 42 mounted on the inner ring 2. The flinger disk 42 provides further shielding to prevent the ingress of dirt or debris by "flinging" it away from the area of the seal 22. One of ordinary skill in the art recognizes that any seal configuration can be provided in the bearing assembly 1 that helps reduce the ingress of dirt and the egress of lubricant.

Figure 2A:
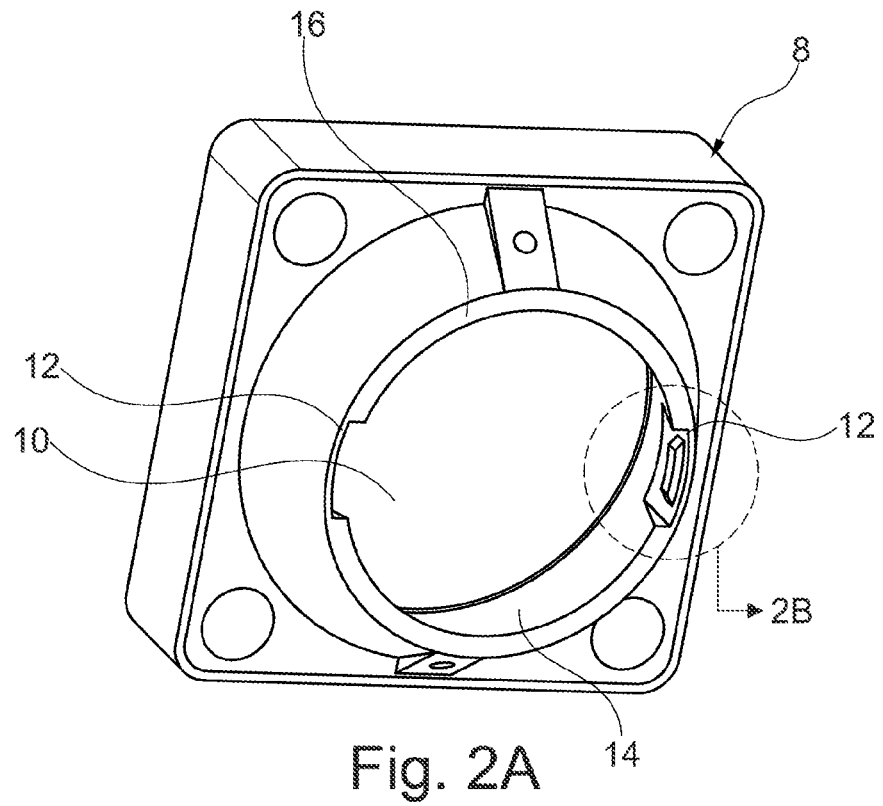
FIG. 2A is a perspective view of the housing of the rolling bearing assembly of FIG. 1.
Figure 2B:
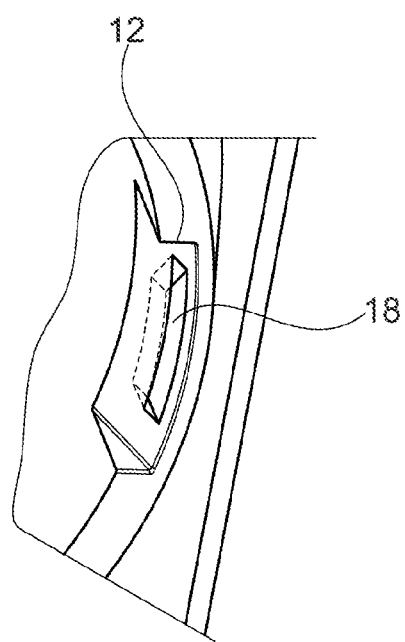
FIG. 2B is a magnified perspective view of a groove formed on the housing of FIG. 2A.
Figure 3:
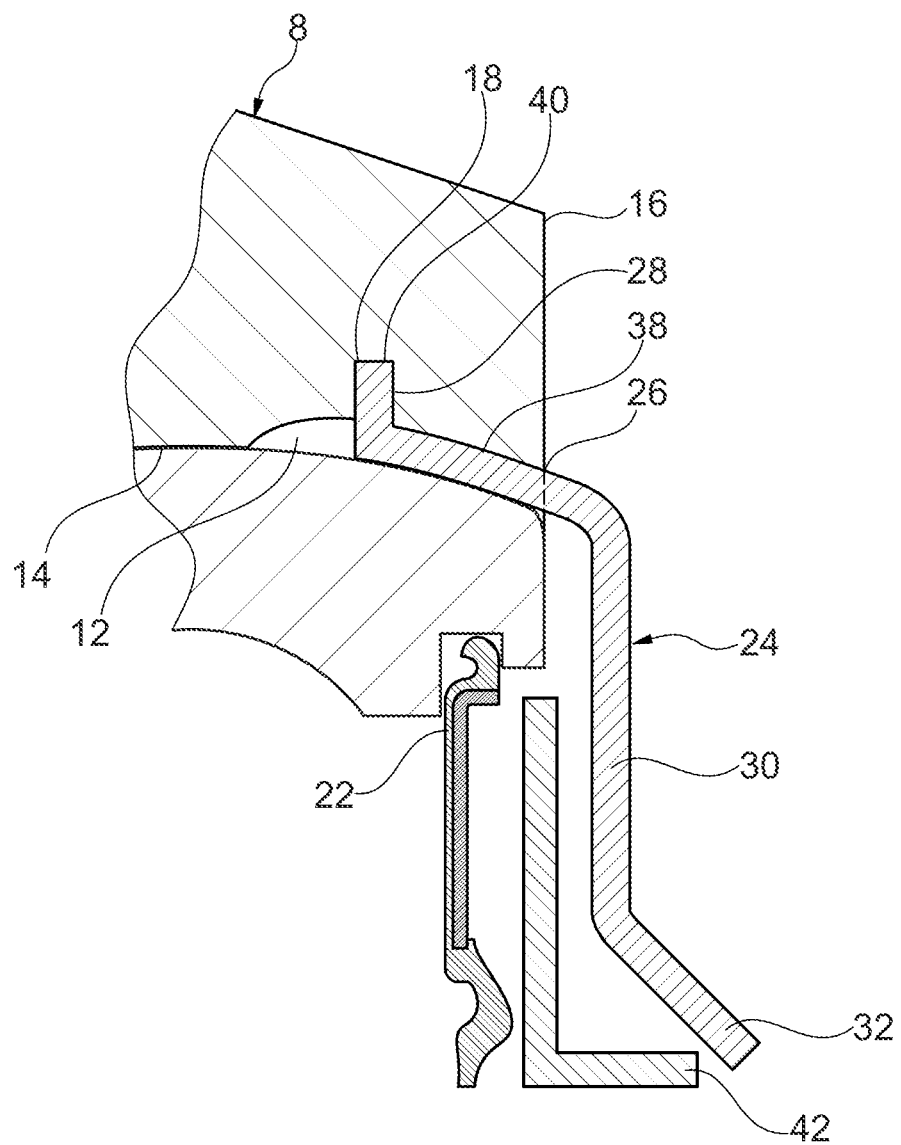
FIG. 3 is a partial cross-sectional view of the rolling bearing assembly of FIG. 1.
Figure 4:
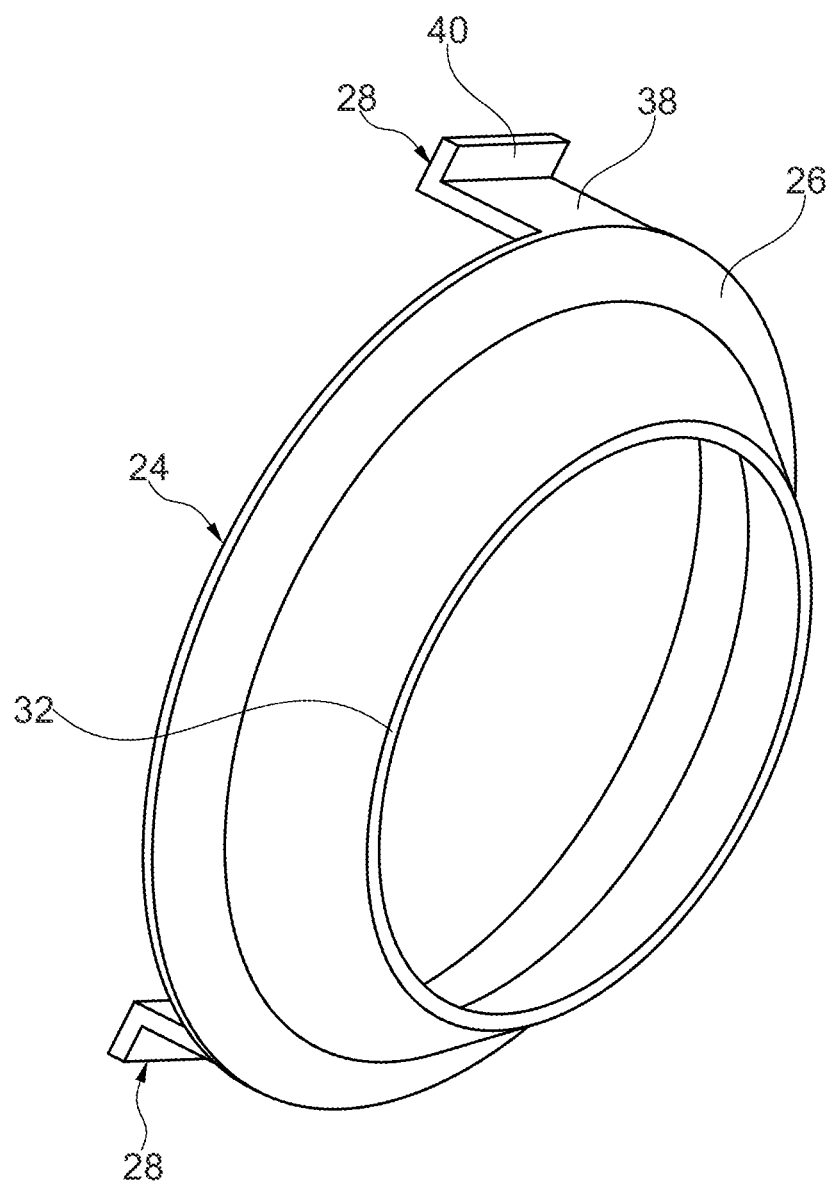
FIG. 4 is a perspective view of the shield of FIGS. 1 and 3.

A housing 8 is provided including an opening 10 in which the outer bearing ring 6 is supported. The housing 8 includes at least one groove 12 on a radially inner surface 14, shown in detail in FIGS. 2A and 2B, that extends from an axial end surface 16 of the housing 8. At least one, and preferably two or more, corresponding radially outwardly extending slots 18 are arranged within the at least one groove 12. The radially outwardly extending slot(s) 18 is preferably formed by milling.

In order to prevent the ingress of debris into the bearing assembly 1, a circumferential shield 24 is provided that includes a radially outer portion 26 having at least one retention tab 28 engaged within the at least one slot 18 of the housing 8. A body 30 of the shield 24 is arranged adjacent to the seal 22. The radially extending flinger disk 42 extends between the seal 22 and the body 30 of the shield 24 to form a tortuous path to create a labyrinth seal arrangement. A radially inner portion 32 of the body 30 extends radially inwardly to a radially outer surface 34 of the inner bearing ring 2. Depending on the application, a clearance between the radially outer surface 34 of the inner bearing ring 2 and the radially inner portion 32 of the body 30 can be increased or decreased in order to reduce friction and wear at the contact area. The radially outer portion 26 of the shield 24 includes an axially extending portion 38 connected to the body 30 and engaged in the at least one groove 12 of the housing 8. A radially outwardly extending flange 40 is connected to the axially extending portion 38 and engages within the at least one radially outwardly slot 18 of the housing 8 with a snap connection based on the elastic deformation of the retention tab 28. The shield 24 is preferably formed from a polymeric material, but could be formed of metallic material or any other suitable material capable of forming an impermeable layer for preventing the ingress of debris into the bearing assembly 1 and providing a snap fit connection of the retention tab 28 with the groove 12 and the radially outwardly extending slot 18. A friction reducing coating can also be provided at the contact point with the inner bearing ring 2. In one preferred arrangement, the housing 8 includes two grooves 12 each including a radially outwardly extending slot 18, and the shield 24 includes two retention tabs 28 that each engage within a respective one of the two slots 18. The two slots 18 of the housing 8 and the two retention tabs 28 of the shield 24 are preferably spaced circumferentially apart by 180°. One of ordinary skill in the art recognizes that any number of grooves 12 can be formed on the housing 8 and corresponding tabs 28 can be formed on the shield 24. Preferably, the grooves 12 and the tabs 28 are spaced apart equally in the circumferential direction.

A method of installing a shield 24 with a bearing assembly 1 is also provided. The method includes providing a bearing assembly 1 including an inner bearing ring 2, an outer bearing ring 6, and a plurality of rolling elements 20 supported between the inner bearing ring 2 and the outer bearing ring 6. The method includes providing a seal 22 that extends radially between the inner bearing ring 2 and the outer bearing ring 6. The method includes providing a housing 8 that includes an opening 10 in which the outer bearing ring 6 is supported and at least one groove 12 on a radially inner surface 14 that extends from an axial end surface 16 of the housing 8, and at least one radially outwardly extending slot 18 arranged within the at least one groove 12. The method includes providing a circumferential shield 24 that includes a radially outer portion 26 having at least one elastically deformable retention tab 28. The method includes inserting the at least one elastically deformable retention tab 28 of the shield 24 into the at least one slot 18 of the housing 8 such that the at least one elastically deformable retention tab 28 is resiliently engaged within the at least one slot 18 of the housing 8.

Having thus described various embodiments of the present bearing assembly in detail, it is to be appreciated and will be apparent to those skilled in the art that many physical changes, only a few of which are exemplified in the detailed description above, could be made in the apparatus without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

LIST OF REFERENCE NUMBERS

1 Bearing assembly
2 Inner Ring
3 Inner Race
4 Shaft
6 Outer Ring
7 Outer Race
8 Housing
10 Opening
12 Groove of Housing
14 Radially Inner Surface of Housing
16 Axial End Surface of Housing
18 Radially Outwardly Extending Slot of Housing
20 Rolling Elements
22 Seal
24 Shield
26 Radially Outer Portion of Shield
28 Retention Tab
30 Body of Shield
32 Radially Inner Portion of Shield
34 Radially Outer Surface of Inner Bearing Ring
38 Axially Extending Portion of Shield
40 Radially Outwardly Extending Flange of Shield
42 Radially Extending Flinger Disk

What is claimed is:

1. A bearing assembly comprising:
an inner bearing ring adapted to receive a shaft,
an outer bearing ring,
a plurality of rolling elements supported between the inner bearing ring and the outer bearing ring, the inner bearing ring defines an inner race on which the plurality of rolling elements run, and the outer bearing ring defines an outer race on which the plurality of rolling elements run,
a seal extending radially between the inner bearing ring and the outer bearing ring,
a housing including an opening in which the outer bearing ring is supported, the housing including at least one groove on a radially inner surface that extends from an axial end surface of the housing, and at least one corresponding radially outwardly extending slot arranged within the at least one groove, and
a circumferential shield including a radially outer portion having at least one elastically deformable retention tab engaged within the at least one slot of the housing, a body of the shield arranged adjacent to the seal, and a radially inner portion of the body extending radially inwardly to a radially outer surface of the inner bearing ring.

2. The bearing assembly of claim 1, wherein the retention tab is formed by an axially extending portion that extends from a radially outer portion of the shield that engages in the at least one groove of the housing, and a radially outwardly extending flange connected to the axially extending portion that engages within the at least one slot of the housing.

3. The bearing assembly of claim 1, wherein the housing includes two slots, and the shield includes two retention tabs that each engage within a respective one of the two slots.

4. The bearing assembly of claim 3, wherein the two slots are spaced circumferentially apart by 180°.

5. The bearing assembly of claim 1, further comprising a radially extending flinger disk located on the inner ring that extends between the seal and the body of the shield to form a labyrinth seal arrangement.

6. The bearing assembly of claim 1, wherein the seal is a lip seal.

7. The bearing assembly of claim 1, wherein the shield is formed from a polymeric material.

8. A method of installing a shield with a bearing assembly, the method comprising:
 providing a bearing assembly including an inner bearing ring, an outer bearing ring, a plurality of rolling elements supported between the inner bearing ring and the outer bearing ring, a seal extending radially between the inner bearing ring and the outer bearing ring, a housing including an opening in which the outer bearing ring is supported and at least one groove on a radially inner surface that extends from an axial end surface of the housing, and at least one radially outwardly extending slot arranged within the at least one groove, and a circumferential shield including a radially outer portion having at least one elastically deformable retention tab; and
 inserting the at least one elastically deformable retention tab of the shield into the at least one slot of the housing such that the at least one elastically deformable retention tab is resiliently engaged within the at least one slot of the housing.

9. The method of claim 8, wherein the housing includes two slots, and the shield includes two retention tabs that are each resiliently engaged within a respective one of the two slots.

* * * * *